Dec. 16, 1958  E. W. HAWKINSON  2,864,445
AUTOMATIC BUFFING MACHINE
Filed June 27, 1957  4 Sheets-Sheet 1

Inventor
Earle W. Hawkinson
By Merchant & Merchant
Attorneys

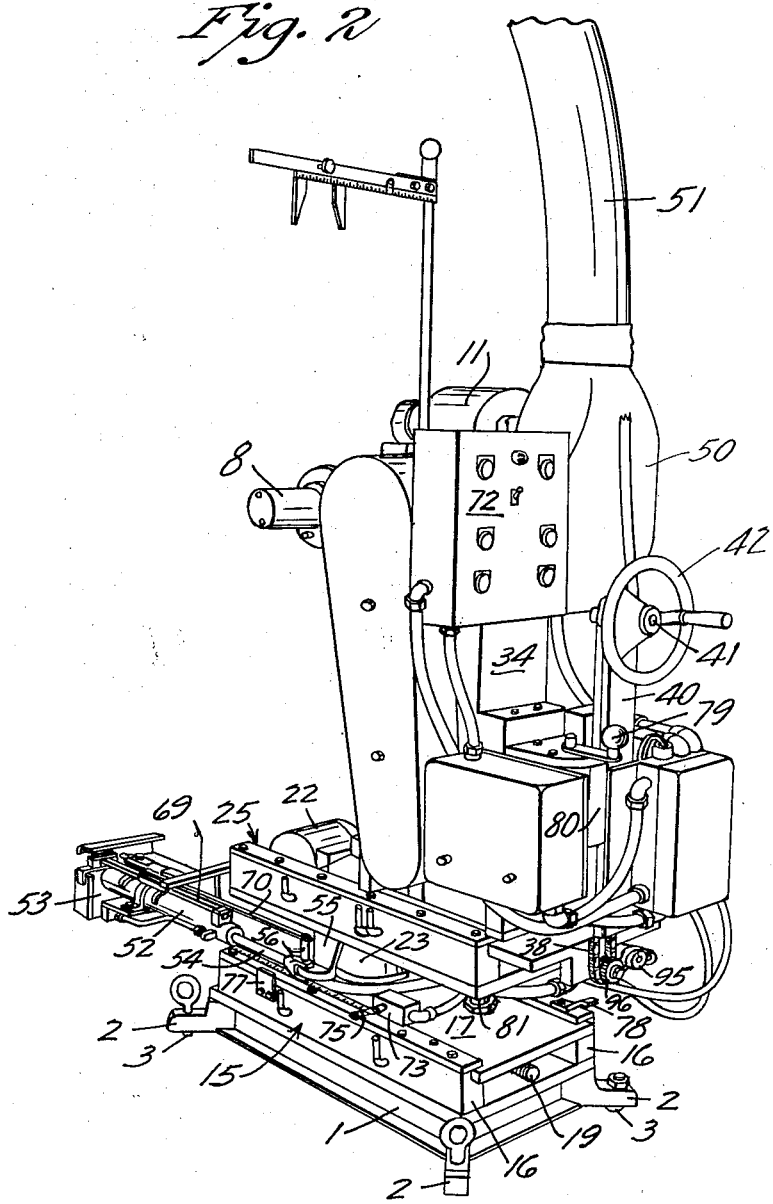

Dec. 16, 1958     E. W. HAWKINSON     2,864,445
AUTOMATIC BUFFING MACHINE
Filed June 27, 1957                                   4 Sheets–Sheet 3
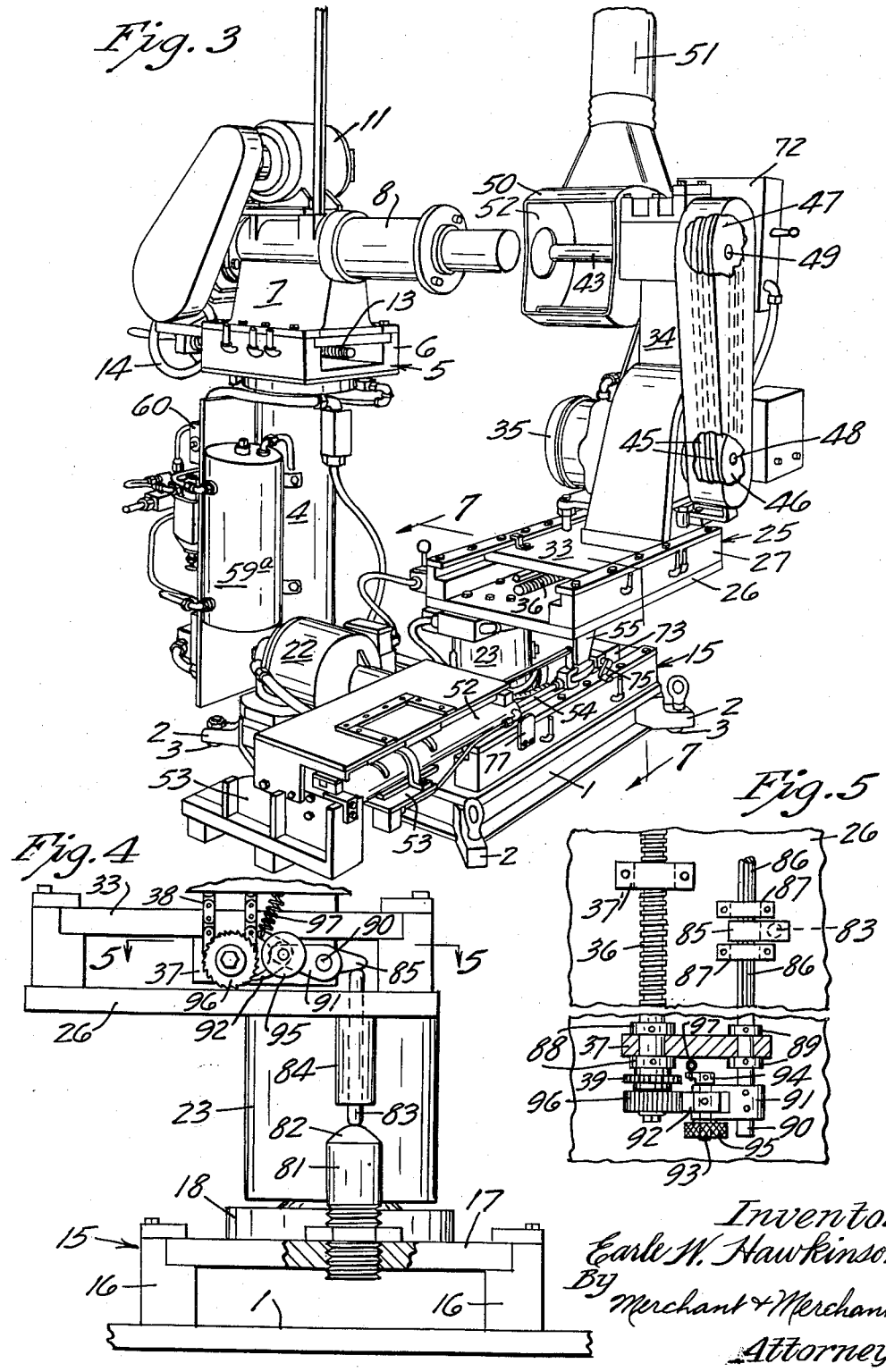
Inventor
Earle W. Hawkinson
By Merchant & Merchant
Attorneys Dec. 16, 1958  E. W. HAWKINSON  2,864,445
AUTOMATIC BUFFING MACHINE
Filed June 27, 1957  4 Sheets-Sheet 4

Inventor
Earle W. Hawkinson
By
Merchant & Merchant
Attorneys

# United States Patent Office 2,864,445
Patented Dec. 16, 1958

2,864,445

AUTOMATIC BUFFING MACHINE

Earle W. Hawkinson, Minneapolis, Minn., assignor to Paul E. Hawkinson Company, Minneapolis, Minn., a corporation of Minnesota Application June 27, 1957, Serial No. 668,418

4 Claims. (Cl. 164—10.2)

My present invention relates generally to pneumatic tire buffing machines, and more particularly is in the nature of an improvement on the buffing machine disclosed and claimed in my United States Letters Patent 2,787,089.

An important object of my invention is the provision of a tire buffing machine having novel means for providing relative movement between a tire to be buffed or abraded, preparatory to retreading the same, and a rotary buffing wheel, whereby the abrading or buffing operation of the road-engaging crown surface portion of the tire is automatically performed.

Another object of my invention is the provision of a machine as set forth, which will automatically feed the buffing wheel relative to the tire at such times and to such a degree that the tire is buffed in the most efficient manner. Heretofore, in manually feeding the buffing element and a tire relatively toward each other, the depth of cut of the buffing wheel into the tire has been left to the discretion of the operator with varying degrees of success by reason of the fact that, in buffing tires, extreme care must be exercised in choosing the depth of cut. If said depth of cut is greater than a predetermined maximum, the rubber on the crown surface of the tire will tend to flow intermittently past the buffing wheel, resulting in cupping of the crown surface.

Another object of my invention is the provision of novel means for automatically moving the buffing wheel alternately in opposite directions across the crown surface of the tire to be buffed, and in a predetermined arcuate path, whereby to provide the crown surface of the tire with the desired contour.

Still another object of my invention is the provision of a tire buffing machine of the above type wherein the automatic mechanism may be quickly and easily rendered inoperative and the machine controlled by manual means, if desired.

The above and still further highly important objects and advantages of my invention will become apparent from the following detailed specification, appended claims and attached drawings.

Referring to the drawings, in which like reference characters indicate like parts throughout the several views.

Fig. 2 is a view in perspective as seen from the rear and the side opposite that of Fig. 1;

Fig. 3 is a view in perspective as seen from the front and the side opposite that of Fig. 1;

Fig. 4 is an enlarged fragmentary view in rear elevation, some parts being broken away and some parts shown in section;

Fig. 5 is a fragmentary detail taken substantially on the line 5—5 of Fig. 4, some parts being removed;

Figure 1:
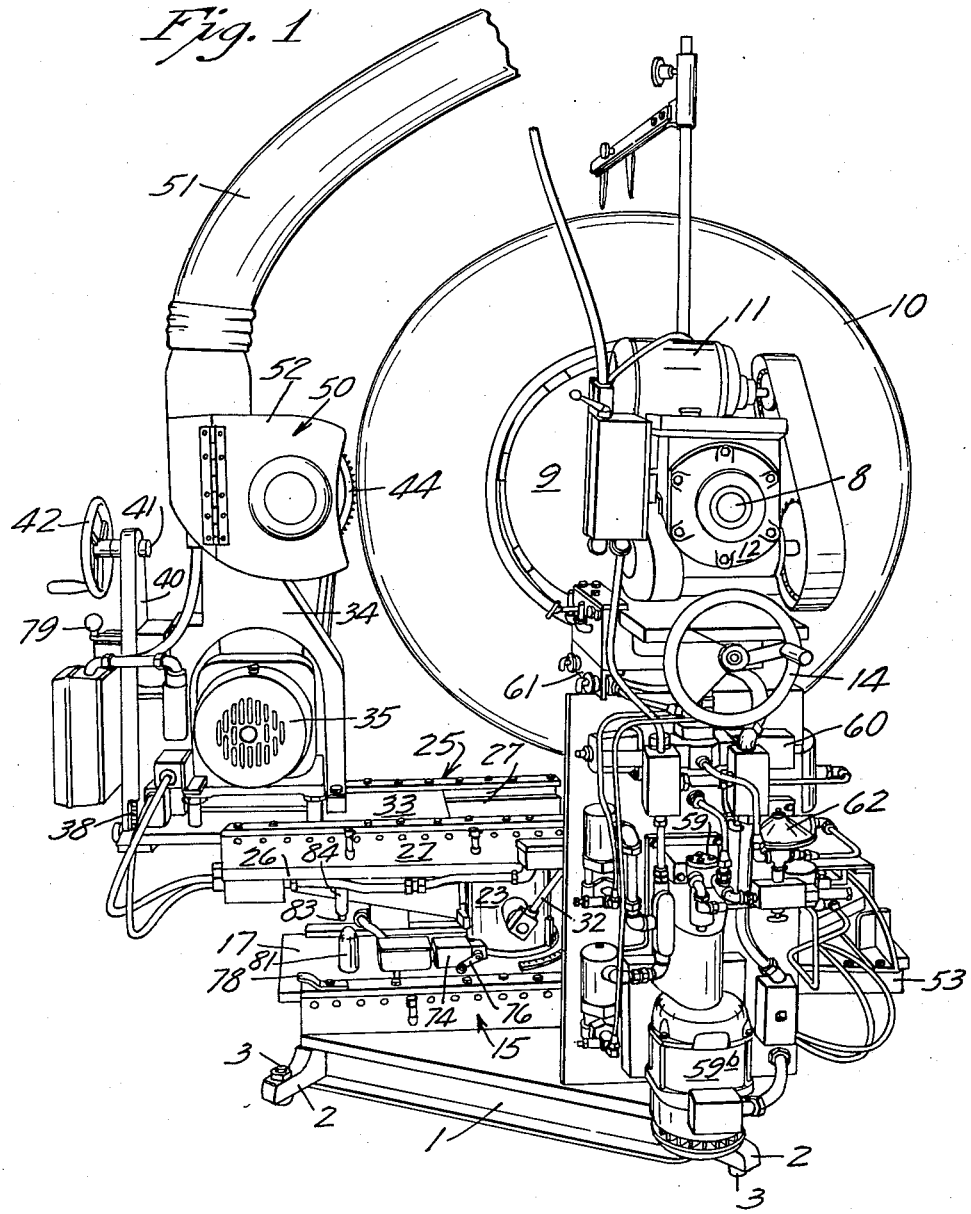
Fig. 1 is a view in perspective of a tire buffing machine built in accordance with my invention.

Referring with greater detail to the drawings, the numeral 1 indicates a horizontally disposed base having a plurality of laterally outwardly projecting feet 2 provided with leveling screws or the like 3. A rigid column 4 is anchored at its lower end to the base member 1 at one side thereof, and projects upwardly therefrom, and has mounted at its upper end a horizontally disposed guideway 5 comprising laterally spaced longitudinally extended guide elements 6. Mounted for longitudinal movements in said guide elements 6 is a slide 7 in which is journalled a rotary shaft 8 that is adapted to have mounted thereon a wheel 9 for carrying a tire 10. The shaft 8 is rotatable on an axis extending longitudinally of the guideway 5 and is power driven from a motor 11 through suitable driving connections including reduction gearing not shown but contained in a gear housing 12 mounted on the slide 7. An adjustment screw 13 extends longitudinally of the guideway 5, and is provided at one end with a handwheel 14, the screw 13 being operatively connected to the guideway 5 and slide 7 in the conventional manner whereby rotation of the screw 13 will cause the slide 7 and the parts carried thereby to be moved longitudinally with respect to the guideway 5.

Figure 7:
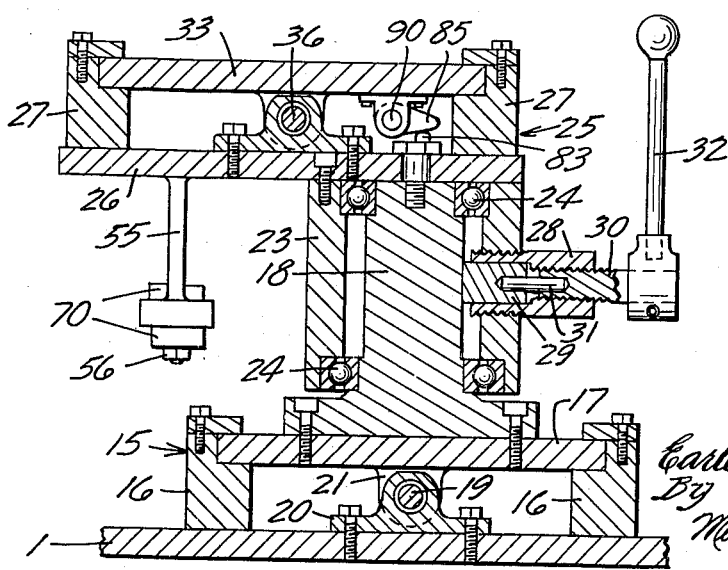
Fig. 7 is an enlarged fragmentary section taken substantially on the line 7—7 of Fig. 3.

A second horizontally disposed guideway 15 comprises a pair of opposed guide elements 16 which are mounted on the base 1 and which extend longitudinally in a direction normal to the axis of the wheel mounting shaft 8. Mounted in the guide elements 16 for movements in opposite directions longitudinally of the guideway 15, is a second slide 17 to the intermediate portion of which is anchored a vertical generally cylindrical standard 18. Means for imparting sliding movements to the second slide 17 in the guideway 15 comprises an elongated adjustment screw 19 that is journalled for rotation in and held against axial movement by a bearing 20 suitably anchored to the base member 1, said adjustment screw 19 being screw threaded in a suitable threaded opening in a nut-acting boss 21 depending from the second slide 17, see Fig. 7. Rotation is imparted to the adjustment screw 19 by a reversible electric motor 22 mounted on the second slide 17, and suitable power transmission mechanism not shown but fully disclosed in my prior patent, above-identified.

A supporting sleeve 23 is mounted for rotation on the cylindrical standard 18, by means of anti-friction bearings 24, and has rigidly mounted to its upper end, a horizontally disposed third guideway 25 comprising a base-plate 26 and cooperating laterally spaced longitudinally extending guide elements 27. Intermediate its ends, the supporting sleeve 23 is provided with a screw-threaded radial opening for the reception of a radially projecting tubular member 28 in which is axially slidably mounted a friction block 29 the inner end of which engages the cylindrical standard 18 to frictionally lock the supporting sleeve 23 and parts carried thereby against rotation on the vertical axis of the standard 18. An actuating screw 30 is screw-threaded in the tubular member 28 and has interposed therebetween and the friction block 29 a thrust rod 31 which imparts movement to the friction block 29 toward engagement thereof with the standard 18 upon rotation of the actuating screw 30 in one direction. Rotation is imparted to the screw 30 by means of a radially outwardly projecting handle 32.

A third horizontally disposed plate-like slide 33 is mounted in the guide elements 27 of the third guideway 25 for sliding movements in opposite directions longitudinally of the guide elements 27, said movements being radially with respect to the standard 18, and has mounted thereon a vertical support 34 and a motor 35. Means for imparting longitudinal sliding movements to the third slide 33 comprises a feed screw 36 journaled in a bearing 37 secured to the third slide 33, said feed screw having screw-threaded engagement with a nut acting element 37', see Fig. 5, operatively connected to the base plate 26. An endless link chain 38 runs over a sprocket wheel 39 fast on the feed screw 36, the flights of the chain 38 extending upwardly within a vertically extended housing 40 in the upper end of which is journalled a shaft 41 that carries a hand whel 42, see Figs. 1 and 2. The endless chain 38 runs over a second sprocket wheel not shown but which may be assumed to be secured to the shaft 41 within the upper end of the housing 40. The above-mentioned mechanism for moving the third slide 33 is fully disclosed in my prior patent above-identified, and not in itself comprising the instant invention, further detailed showing and description thereof is believed unnecessary.

A horizontally disposed rotary shaft 43 is journalled in the upper end portion of the vertical support 34 on an axis extending transversely of the direction of movement of the third slide 33 and disposed on a level with the axis of the wheel mounting shaft 8. Securely mounted on the shaft 43 for common rotation therewith is a rotary rasp or buffing wheel 44 that is adapted to engage the portion of the tire 10 desired to be buffed. The shaft 43 is operatively coupled to the drive motor 35 by power transmission belts which run over cooperating pulleys 46 and 47 mounted on the drive shaft 48 of the motor 35 and the extended end portion 49 of the shaft 43 respectively. Preferably, the buffing wheel or rasp 44 is partially contained within an open sided hood 50 that is adapted to collect the material which is abraded from the outer surface of the tire 10 by the buffing wheel 44. A conduit 51 communicates at one end with the hood 50 and may be assumed to be connected to a suitable dust collecting apparatus for the purpose of drawing the abraded particles away from the hood 50. Preferably, and as shown in Fig. 1, one side of the hood 50 is provided with a hinged access door 52 which, when opened, permits quick and easy removal and replacement of the buffing or abrading wheel 44 or the abrading band carried thereby.

Figure 6:
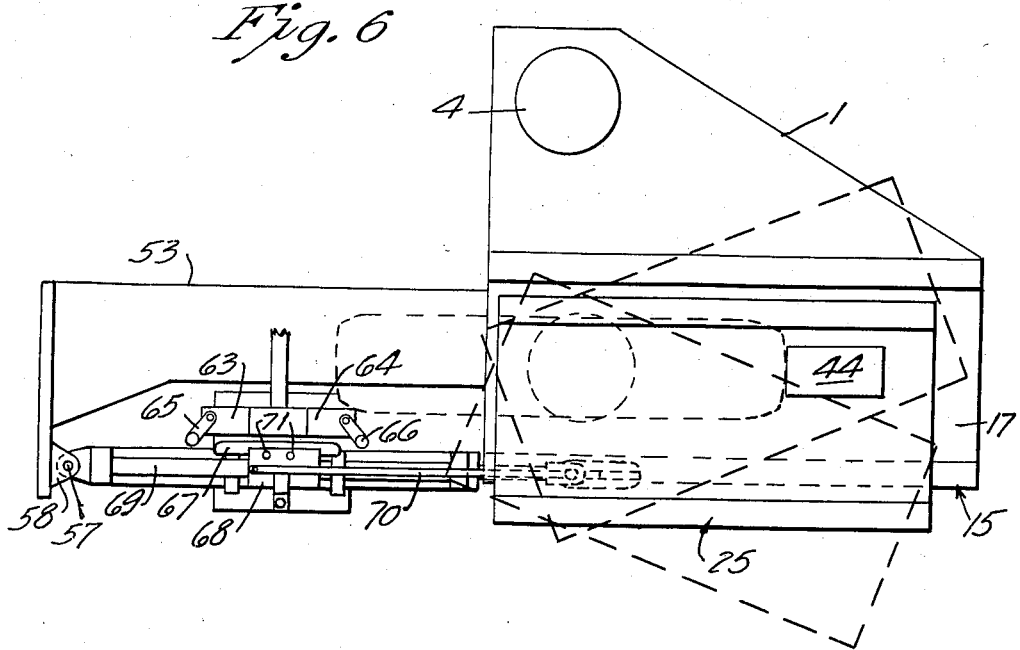
Fig. 6 is a view in top plan, several of the parts of the machine being shown diagrammatically.

Movement of the second slide 17 in its respective guideway 15 is utilized to properly locate the axis of the arc traversed by the buffing wheel 44 during the buffing of the road engaging crown surface of a given tire when the supporting sleeve 23, third guideway 25 and parts carried thereby are oscillated about the axis of the cylindrical standard 18. Obviously, movement of the third slide 33 with respect to its third guideway 25 determines the radius of said arc. Means for imparting oscillatory movement to the third guideway 25 and parts carried thereby comprises a fluid pressure cylinder 52 mounted on an extended portion 53 of the second slide 17, and a cooperating piston-equipped plunger rod 54 pivotally secured at its outer end to a bracket 55 which is anchored to and depends from the base-plate 26 of the third guideway 25 in radially outwardly spaced relation to the supporting sleeve 23. The pivotal connection between the plunger rod 54 and bracket 55 is indicated at 56. As shown in Fig. 6, one end of the cylinder 52 is pivotally secured, as at 57 to a mounting bracket 58 at the adjacent end of the extension 53 of the second slide 17. Obviously, extending movement of the plunger rod 54 with respect to the cylinder 52 will cause the third guideway 25 and all parts carried thereby to be pivotally moved in one direction about the axis of the cylindrical standard 18, whereas retracting movements of the plunger rod 54 will cause the third guideway 25 to be pivotally moved in the opposite direction.

The fluid pressure cylinder 52 is interposed in a conventional fluid pressure system involving a pump 59 which draws fluid from a supply tank 59a and which is driven by an electric motor 59b, a reversing valve, indicated generally at 60, metering valve mechanism 61, a pressure regulating valve 62, and conduit means suitably connecting the various components in an operative system. This fluid pressure system, in itself, does not comprise the instant invention, and detailed description thereof is omitted in the interest of brevity. Control of the reversing valve 60 is had through a pair of reversing switches 63 and 64 that are mounted for common movements with the extension 53 of the second slide 17, the switches 63 and 64 having operating arms 65 and 66 respectively that are adapted to be alternately engaged by a trip bar 67 mounted for sliding movements longitudinally of the cylinder 52 on a carriage 68. The carriage 68 is slidably mounted on a slide bar 69 secured at its opposite ends to opposite end portions of the cylinder 52 and in spaced parallel relation to the cylinder 52. A rigid link 70 is connected at one end to the carriage 68 and at its opposite end to the pivotal connection 56 between the plunger rod 54 and the bracket 55. The arrangement is such that, upon predetermined pivotal movement of the third guideway 25 and parts carried thereby, in either direction, the operating arm 65 or 66 of this respective reversing switch 63 or 64 will be operatively engaged by the adjacent end of the trip bar 67 to cause pivotal movement of the third guideway 25 and parts carried thereby in the opposite direction. The trip bar 67 is held in place by a pair of clamping screws 71, and when it is desired to vary the length of stroke of the plunger rod 54, the trip bar 67 is removed and another trip bar, not shown, but of different length is inserted in lieu thereof. The fluid pressure system is further controlled by one of a plurality of switches contained in a control box 72 so that, if desired, the system may be rendered inoperative and the third guideway 25 and parts carried thereby may be manually pivotally moved if desired. Other switches in the control box 72 control operation of the reversible motor 22 to move the second slide 17 and parts carried thereby with respect to the second guideway 15. It will here be noted that movement of the second slide 17 is further controlled by a pair of limit switches 73 and 74 having operating arms 75 and 76 respectively, said operating arms being adapted to engage respective actuators 77 and 78 mounted on the second guideway 15, to limit movement of the second slide 17 in opposite directions. Other switches in the control box 72 are utilized to control operation of the motors 11 and 59b, and a control handle 79 is utilized to operate a switch contained within a housing 80 to control operation of the buffing wheel motor 35.

As heretofore indicated, it is important that the depth of cut made by the buffing wheel 44 in the tire surface to be buffed, is not excessive. For the purpose of automatically moving the buffing wheel 44 toward the road engaging crown surface of the tire 10 during pivotal or oscillatory movements of the third guideway 25 and parts carried thereby, I provide novel feeding means now to be described. Rigidly mounted in and extending upwardly from the second slide 17, in radially spaced relation to the cylindrical standard 18, is a cam element in the nature of a shaft or pin 81 having a cam surface 82 at its upper end which lies in the arcuate path of travel of the lower end of a push rod 83 that is mounted for vertical sliding movements in a bearing 84 welded or otherwise rigidly secured to the base plate 26 of the third guideway 25. The upper end portion of the push rod 83 extends upwardly through a suitable opening in the base plate 26, the extreme upper end of the push rod 83 engaging the outer end of a rock arm 85 that is mounted on a rock shaft 86 for axial sliding movements relative thereto and keyed to the shaft 86 for common rocking movements therewith. The rock shaft 86 is journalled in the bearing 37 in laterally spaced parallel relation to the feed screw 36, and extends through a pair of block elements 87 that are rigidly secured to the base plate 26 one on each side of the rock arm 85 to hold the rock arm against axial movement with the rock shaft 86 and in overlying relation to the upper end of the push rod 84, but permitting rocking movements thereof and said rock shaft 86. With further reference to Fig. 5 it will be seen that stop collars 88 and 89 are mounted on the feed screw 36 and rock shaft 86 respectively and on opposite sides of the bearing 37, to prevent axial movement of the feed screw 36 and rock shaft 86 with respect to the third slide 33. Rigidly mounted on the outer end 90 of the rock shaft 86 is a crank element 91 having a bifurcated outer end for the reception of a pawl 92. The pawl 92 is rigidly mounted on a pivot pin 93 that extends through the bifurcated end of the crank element 91 in laterally spaced parallel relation to the rock shaft 86, said pivot pin having rigidly secured to its inner end a relatively short crank arm 94 and at its outer end a knurled knob 95. The pawl 92 cooperates with a ratchet wheel 96 rigidly mounted on the outer end of the feed screw 36 to turn the feed screw 36 in a direction to feed the third slide 33 and parts carried thereby toward engagement of the buffing wheel 44 with the tire 10 responsive to rocking movements of the rock shaft 86. The pawl 92 is yieldingly urged toward engagement with the ratchet wheel 96 by a coil tension spring 97 secured at one end to the outer end of the crank arm 94 and at its other end to the vertical support 34, see Fig. 4. With the above arrangement, during pivotal oscillating movement of the third guideway 25 and parts carried thereby about the axis of the cylindrical standard 18, the push rod 83 is carried into engagement with the cam surface 82 of the shaft or stem 81 and is moved upwardly by such engagement to impart rocking movement to the rock shaft 86 in a direction to cause the pawl 92 to impart rotary movement to the ratchet wheel 96 and feed screw 36. Such rotation of the feed screw 36 is made only to the extent of a fraction of a single revolution with each rocking movement of the rock shaft 86, so that the resultant movement of the buffing wheel 44 toward the tire 10 is very small. After a given tire 10 that has been properly mounted on the shaft 8, and initial adjustment made to the several slides 7, 17, and 33, manipulation of the several switches in the control box 72 will cause automatic pivotal oscillatory movements to be imparted to the second guideway 25 and parts carried thereby, and automatic feeding movements to be imparted to the third slide 33. When it is desired to render automatic feeding of the third slide 33 inoperative, so that the third slide 33 may be manually adjusted or set by manipulation of the hand wheel 42, it is only necessary to rotate the knurled knob 95 in a counter-clockwise direction with respect to Fig. 4 to the extent that the outer end of the crank arm 94 on the pivot pin 93 moves beyond dead center, thereby causing the spring 97 to yieldingly urge the pawl 92 in a direction away from engagement with the ratchet wheel 96. Obviously, when the automatic oscillating and feeding mechanism has been rendered inoperative, the machine may be adjusted manually and caused to operate in the same manner as the machine of my prior patent above-identified.

While I have shown and described a commercial embodiment of my novel buffing machine, it will be understood that the same is capable of modification, and that modification may be made without departure from the spirit and scope of the invention as defined in the claims.

What I claim is:

1. A tire buffing machine comprising, a base, a fixed column extending upwardly from said base, a first horizontally disposed guideway at the top of said column, a first slide mounted in said guideway for movement longitudinally thereof, means for imparting said movement to said first slide, a tire supporting shaft journalled in said first slide for rotation on a horizontal axis extending in the direction of sliding movement of said first slide and for common sliding movements therewith, power means for rotating said shaft, a second horizontally disposed guideway secured to the base, said second guideway being laterally spaced from said column in the direction of longitudinal movement of said first slide and below a tire casing mounted on said shaft, said second guideway extending in a direction normal to the axis of said shaft and the direction of movement of said first slide, a second slide mounted for longitudinal sliding movement in said second guideway, power means for imparting said movement to the second slide selectively in opposite directions, a third horizontally disposed guideway, a third slide mounted in said third guideway for longitudinal movement therein, means for imparting longitudinal movement to said third slide selectively in opposite directions in said third guideway, mounting means pivotally mounting said third guideway on said second slide for rotation about a substantially vertical axis with said longitudinal movement of said third slide being radial of said vertical axis at all times, a second shaft carried by said third slide and movable therewith, said second shaft extending axially in a direction normal to the direction of longitudinal movement of said third slide, a buffer wheel mounted on said second shaft for common rotation therewith, power means for rotating said second shaft, power means operatively connected to said second slide and to said third guideway for imparting limited rotary movements to said third guideway and parts carried thereby in opposite directions, control means for said last-mentioned power means operative to limit rotation of said third guideway in opposite directions, and means including cooperating actuating elements on said second slide and third guideway for controlling operation of the movement imparting means for said third slide, said controlling means being responsive to rotation of said third guideway on the axis of its respective mounting means to cause step by step movement of said third slide in one direction longitudinally of said third guideway, the longitudinal movement of the third slide being operative to adjust the radius of the buffing arc, the first and second slides being operative to bring a tire casing and said buffing wheel together for proper buffing of a tire tread or shoulder portion, the second slide initially adjusting the buffing wheel into a buffing position, adjustment of the first slide being generally for buffing a tire shoulder portion.

2. The structure defined in claim 1 in which said power means for imparting said limited rotary movement to the third guideway comprises, a fluid pressure cylinder and a cooperating piston equipped plunger rod one operatively connected to said second slide and the other connected to said third guideway, a source of fluid under pressure, and valve means for admitting fluid under pressure alternately to opposite ends of said cylinder to reverse the direction of rotary movement of said third guideway about the axis of the mounting means therefor.

3. The structure defined in claim 1 in which said means for imparting said longitudinal movement to the third slide comprises a feed screw journalled to said third guideway and a cooperating nut on said third slide, said means for controlling said movement of the third slide further including, a rockshaft on said third guideway, an actuator engaging crank element and pawl mechanism on said rock shaft, and a ratchet on said feed screw engaged by said pawl to rotate said screw in a direction to move the third slide toward engagement of the buffer wheel with a tire mounted on said first shaft responsive to actuator imparted movement of said crank element in one direction.

4. The structure defined in claim 3 in which said pawl mechanism includes, a second crank element on said rock shaft, a pawl element pivotally mounted on said second crank element, and yielding means urging said pawl element toward engagement with said ratchet, and in further combination with means for shifting the direction of bias of said yielding means whereby to cause the pawl element to be urged in a direction away from engagement with said ratchet to render said controlling means inoperative.

No references cited.